United States Patent
Wu et al.

(10) Patent No.: US 7,678,438 B2
(45) Date of Patent: Mar. 16, 2010

(54) OPTICAL MEDIA

(75) Inventors: Kuohua Wu, Tucson, AZ (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1081 days.

(21) Appl. No.: 11/249,823

(22) Filed: Oct. 12, 2005

(65) Prior Publication Data

US 2007/0082167 A1    Apr. 12, 2007

(51) Int. Cl.
*B32B 3/02*    (2006.01)
(52) U.S. Cl. .................... 428/64.1; 428/64.4; 428/64.5; 430/270.12; 430/270.13
(58) Field of Classification Search ................ 428/64.5, 428/64.6; 430/270.13
See application file for complete search history.

(56) References Cited

U.S. PATENT DOCUMENTS

| | | | |
|---|---|---|---|
| 5,573,831 A | 11/1996 | Suzuki | |
| 6,728,198 B2 | 4/2004 | Fujii | |
| 6,862,033 B2 | 3/2005 | McClellan | |
| 6,904,002 B2 | 6/2005 | Awano | |
| 7,050,387 B2 * | 5/2006 | Tsujita et al. | 369/283 |
| 7,172,991 B2 * | 2/2007 | Anderson et al. | 503/206 |
| 7,226,889 B2 * | 6/2007 | Matsuishi et al. | 503/200 |
| 7,268,794 B2 * | 9/2007 | Honda et al. | 347/224 |
| 7,331,055 B2 * | 2/2008 | Onodera et al. | 720/718 |
| 7,333,126 B2 * | 2/2008 | Taugher et al. | 347/224 |
| 2002/0021656 A1 * | 2/2002 | Tsukagoshi et al. | 369/275.3 |
| 2003/0108708 A1 * | 6/2003 | Anderson et al. | 428/64.4 |
| 2005/0036768 A1 | 2/2005 | Matsuishi | |
| 2005/0099929 A1 | 5/2005 | Tsuyoshi | |
| 2007/0081070 A1 * | 4/2007 | Wu et al. | 347/224 |

FOREIGN PATENT DOCUMENTS

| | | |
|---|---|---|
| EP | 1162614 | 12/2001 |
| EP | 1693835 | 8/2006 |
| WO | WO 2005083712 | 9/2005 |

OTHER PUBLICATIONS

International Search Report for PCT/US2006/029173, mailed Dec. 27, 2006, 4 pages.

* cited by examiner

*Primary Examiner*—Elizabeth Mulvaney

(57) ABSTRACT

One embodiment of an optical medium includes a substrate, a data recording layer positioned on the substrate, a selectively transmissive layer positioned on the data recording layer, and a label recording layer positioned on the selectively transmissive layer, the label recording layer optically accessible at only certain wavelengths through the data recording layer and through the selectively transmissive layer.

27 Claims, 1 Drawing Sheet

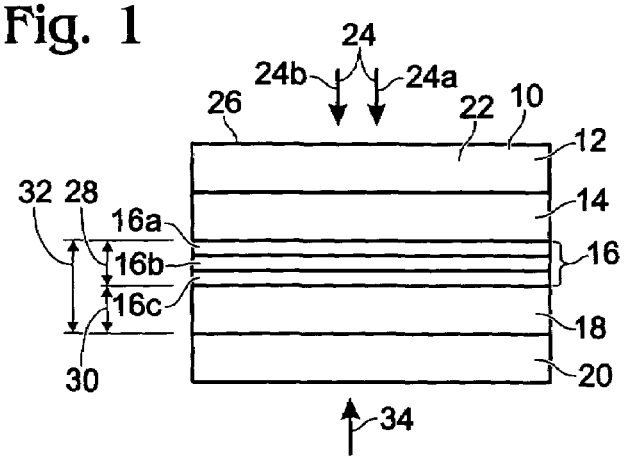
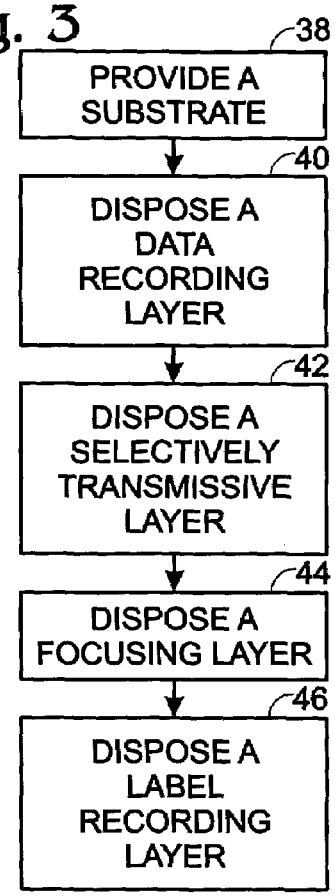
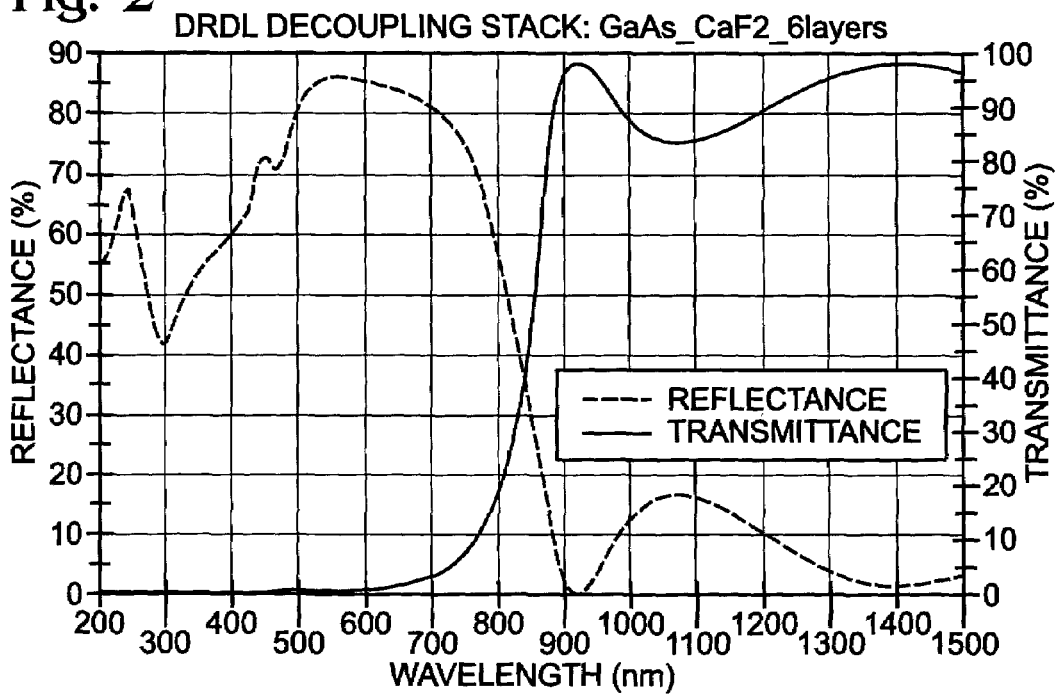

OPTICAL MEDIA

BACKGROUND

Optical media, such as CDs and DVDs, may be recorded with digital data such as computer programs, music, photos, and movies. The optical media may also be recorded with a visible label that identifies the contents of the digital data. Decreasing the time required to record the data and the label on the optical media, and reducing the complexity of user interactions associated with the recording process, may be advantageous.

BRIEF DESCRIPTION OF THE DRAWINGS

FIG. 1 is a schematic cross-sectional side view of one embodiment of an optical media according to the present invention.

FIG. 2 is a graph showing a percentage reflectance and a percentage transmittance for two wavelengths of light projected to one embodiment of an optical media according to the present invention.

FIG. 3 is a flow chart showing one embodiment of a method of recording an optical medium.

DETAILED DESCRIPTION OF THE DRAWINGS

FIG. 1 is a schematic cross-sectional side view of one embodiment of an optical media 10. Optical media 10 may be a CD (compact disc), DVD (digital versatile disc), or similar media that may be recorded with digital data, such as binary data, for example, computer readable code, music, pictures, movies, and the like. Media 10 may include multiple layers such as a substrate 12, a data recording layer 14, and a label recording layer 20. In the embodiment shown, media 10 also includes a selectively transmissive layer 16 and a spacing layer 18. In other embodiments, either or both of selectively transmissive layer 16 and/or spacing layer 18 may not be present or may be positioned in stack 22 in a different position than the layer position shown in FIG. 1. Selectively transmissive layer 16 may include multiple sub layers, such as three sub layers 16a, 16b and 16c, as shown. In other embodiments, other numbers of sub layers of selectively transmissive layer 16 may be utilized, and the other layers of stack 22 may also include sub layers therein.

Substrate 12 may be utilized to support the other layers of stack 22. In one embodiment, substrate 12 may be an optically transmissive polycarbonate layer having a thickness in a range of approximately 100 nm to 3 mm, and more particularly, in a range of 500 nm to 3 mm. In other embodiments, other materials and thicknesses may be utilized.

Data recording layer 14 may be an optically transmissive layer of phase change media having a thickness in a range of approximately 100 nm to 10 um. Phase change media may be defined as a material that changes between the crystalline and amorphous phases. The recorded data mark can be either in a crystalline state or an amorphous state. Most of the time, the crystalline state exhibits a higher reflectivity than the amorphous state. Data recording layer 14 may be adapted to have digital data recorded thereon, such as binary data, for example, computer readable code, music, pictures, and the like. The data may be recorded on layer 14 by projecting a light beam 24 to data recording layer 14 through substrate 12. The light beam is controllably impinged onto a desired location of data recording layer 14 for a sufficient time and at a sufficient intensity to cause the phase change to occur at that location. In one example, data may be recorded to data recording layer 14 by projecting a first wavelength of light 24a to layer 14, such as a wavelength of light in a range of approximately 300 to 850 nanometers (nm), and in one embodiment, a beam of light having a wavelength in a range of approximately 380 nm to 849 nm, and in particular, approximately 550 nm. However, any type or wavelength of light, from any type of light source, may be utilized to record data to data recording layer 14 in a particular application.

Label recording layer 20 may be manufactured of labeling materials, such as thermally activated label material. In one embodiment, HP LightScribe (Registered Trademark of Hewlett Packard Corporation) label material, may be utilized, using an absorber dye tuned to a 900 nm or longer wavelength. In one embodiment, the absorber dye may be a H.W. Sands Corp. (Registered Trademark of H.W. Sands Corporation) SDA3235, SDA7779 or a similar NIR absorbing dye for use with approximately 900 nm lasers, and other dyes such as SDA1981 or SDA9800 may be used for longer wavelength lasers such as a 1000 nm lasers. Layer 20 may have a thickness in a range of approximately 100 nm to 50 um. In other embodiment, other materials and thicknesses may be utilized. Label recording layer 20 may be adapted to have a visible label recorded thereon, such that a person viewing a first outer surface 26, or viewing the exterior surface of layer 20, of media 10 may visually observe the recorded label. For example, in the embodiment wherein multiple musical songs are recorded to data layer 14, the visible label recorded on layer 20 may include graphics and/or text such as the song titles, the length of each song, the song artist, the music company that produced and/or recorded the song and the album title. The visible label may be recorded on layer 20 by projecting a light beam 24 to label recording layer 20 through substrate 12, data recording layer 14, selectively transmissive layer 16, and spacing layer 18. As a result of impinging light energy of the proper wavelength onto the thermally activated label material, a change in the color, contrast, and/or lightness of the material occurs at the impinged location.

In one embodiment, a visible label may be recorded on label recording layer 20 by projecting a second wavelength of light 24b to layer 20, such as a wavelength of light in a range of approximately 780 nm to 1500 nm, and more particularly, light in a range of 850 nm to 1300 nm, and particularly, a wavelength of light of approximately 920 nm. However, any type or wavelength of light, from any type of light source, may be utilized to record a label on label recording layer 20 in a particular application. For example, the actual bandwidth of selective transmissive layer 16 can be designed to transmit or reflect any desired wavelength range such that the media 10 may be application specific.

Selectively transmissive layer 16, which may also be referred to as a selectively reflective layer 16, may in some embodiments be manufactured of multiple sub layers of a variety of materials, such as layers of metal, semi-metal, dielectric and/or liquid layers, with different thicknesses in each layer. In some embodiments, layer 16 may have a thickness 28 in a range of 15 nm to 5000 nm. In one embodiment, selectively transmissive layer 16 may include three sublayers 16a, 16b and 16c, which may be a GaAs layer 16a having a refractive index of 4.24299 and a thickness of 36.35 nm, a CaF2 layer 16b having a refractive index of 1.43612 and a thickness of 60.54 nm, and GaAs layer 16c having a refractive index of 4.24299 and a thickness of 45.92 nm, for a total layer thickness 28 of 142.82 nm. In this embodiment, layer 16 may have an eighty percent reflectance and a five percent transmittance at approximately 550 nm, and a ninety percent transmittance and a zero percent reflectance at approximately 1000 nm. Accordingly, in such an embodiment, layer 16 is selectively transmissive at a wavelength of approximately 1000 nm. A first wavelength of light 24a, therefore, of approximately 550 nm may be utilized to record data to data recording layer 14 wherein substantially, i.e., at least seventy percent, of the light 24a is reflected by selectively transmissive layer 16 such that the light does not transmit to and does not damage or interfere with label recording on label recording layer 20. Moreover, the high reflectivity of layer 16 may be utilized to selectively reflect light 24a in order to provide focus and tracking servo information as well as to assist in data decoding. Additionally, a second wavelength of light 24b of approximately 1000 nm may be utilized to record a visible label on label recording layer 20 wherein substantially, i.e., at least seventy percent, of the light 24b is transmitted by selectively transmissive layer 16 such that the light enables a visible label to be produced on label recording layer 20. Due to the utilization of different wavelengths of light 24a and 24b to record data to data recording layer 14 and to record a visible label to label recording layer 20, both wavelengths of light may be projected simultaneously to optical media 10. Moreover, due to the inclusion of selectively transmissive layer 16, both light 24a and 24b can be projected to the same side or surface 26 of optical media 10 to record the digital data and the visible label, respectively, to media 10 without turning over or otherwise repositioning of optical media 10 in an optical media recording mechanism or drive. Accordingly, the time and complexity of recording data and a visible label to media 10 may be reduced by the inclusion of selectively transmissive layer 16.

In another embodiment, layer 16 may include three sublayers 16a, 16b and 16c, which may be an InP layer 16a having a refractive index of 3.76701 and a thickness of 40.94 nm, a SiO2 layer 16b having a refractive index of 1.46178 and a thickness of 57.63 nm, and an InP layer 16c having a refractive index of 3.76701 and a thickness of 51.72 nm, for a total layer thickness 28 of 150.3 nm. In this embodiment, layer 16 may have a seventy percent reflectance and a five percent transmittance at approximately 550 nm, and an eighty percent transmittance and a zero percent reflectance at approximately 1000 nm. Accordingly, layer 16 is selectively transmissive at a wavelength of approximately 1000 nm. A first wavelength of light 24a, therefore, of approximately 550 nm may be utilized to record data to data recording layer 14 wherein substantially, i.e., at least seventy percent, of the light 24a is reflected by selectively transmissive layer 16 such that the light does not transmit to and does not damage or interfere with label recording on label recording layer 20. Additionally, a second wavelength of light 24b of approximately 1000 nm may be utilized to record a visible label on label recording layer 20 wherein substantially, i.e., at least seventy percent, of the light 24b is transmitted by selectively transmissive layer 16 such that the light enables a visible label to be produced on label recording layer 20. Due to the utilization of different wavelengths of light 24a and 24b to record digital data to data recording layer 14 and to record a visible label to label recording layer 20, both wavelengths of light may be projected simultaneously to optical media 10. Moreover, due to the inclusion of selectively transmissive layer 16, light 24 can be projected to the same side or surface 26 of optical media 10 to record data and a label, respectively, to media 10 without turning over or otherwise repositioning of optical media 10 in an optical media recording mechanism or drive. Accordingly, the time and complexity of recording data and a visible label to media 10 may reduced by the inclusion of selectively transmissive layer 16.

In another embodiment, selectively transmissive layer 16 may include six sublayers, which may be a GaAs layer 16a having a refractive index of 4.24299 and a thickness of 26.59 nm, a CaF2 layer 16b having a refractive index of 1.43612 and a thickness of 88.75 nm, and GaAs layer 16c having a refractive index of 4.24299 and a thickness of 49.98 nm, a CaF2 layer 16d having a refractive index of 1.43612 and a thickness of 79.55 nm, a GaAs layer 16e having a refractive index of 4.24299 and a thickness of 32.06 nm, and a CaF2 layer 16f having a refractive index of 1.43612 and thickness of 133.75 nm for a total layer thickness 28 of 410.68 nm. (Layers 16d-f are not shown in the drawings for ease of illustration, but would be positioned sequentially below layer 16c as shown). A transmittance and reflectance graph for this embodiment of selectively transmissive layer 16 is shown in FIG. 2.

Referring to FIG. 2, in this embodiment, layer 16 may have an eighty-five percent reflectance and a one percent transmittance at approximately 550 nm, and a ninety percent transmittance and a zero percent reflectance at approximately 920 nm. Accordingly, layer 16 is selectively transmissive at a wavelength of approximately 920 nm. A first wavelength of light 24a, therefore, of approximately 550 nm may be utilized to record data to data recording layer 14 wherein substantially, i.e., at least seventy percent, of the light 24a is reflected by selectively transmissive layer 16 such that the light does not transmit to and does not damage or interfere with label recording on label recording layer 20. Additionally, a second wavelength of light 24b of approximately 920 nm may be utilized to record a visible label on label recording layer 20 wherein substantially, i.e., at least seventy percent, of the light 24b is transmitted by selectively transmissive layer 16 such that the light enables a visible label to be produced on label recording layer 20. In other words, selectively transmissive layer 16 allows labeling light to pass therethrough such that a sufficient amount of light energy is present to record a visible label on layer 20, while providing a high reflectance of a first wavelength 24a during data read and write operations. Due to the utilization of different wavelengths of light 24a and 24b to record data to label 14 and to record a visible label to layer 20, both wavelengths of light may be projected simultaneously to optical media 10. Moreover, due to the inclusion of selectively transmissive layer 16, light 24 can be projected to the same side 26 of optical media 10 to record digital data and a visible label, respectively, to media 10 without turning over or otherwise repositioning of optical media 10 in an optical media recording mechanism or drive. Accordingly, the time and complexity of recording data and a visible label to media 10 may be reduced by the inclusion of selectively transmissive layer 16 and/or by the use of two different wavelengths of light.

In the embodiment shown, selectively transmissive layer 16 may be formed on data recording layer 14 by a deposition process, such as physical vapor deposition, such as sputtering or evaporation. In another embodiment, wherein layer 14 may be formed of other materials or may be formed on another applicable layer of optical media 10, other formation methods may be utilized, such as chemical vapor deposition.

In other embodiments, selectively transmissive layer 16 may be manufactured utilizing other materials, such as tantalum oxide, niobium oxide, tin oxide, and the like. In such other embodiments, the percentage reflectance and transmittance, and the wavelength values and/or peaks and valleys of the reflectance and transmittances values, will differ depending on the materials utilized. Spacing or focusing layer 18 may be manufactured of any suitable material, and in one embodiment may be manufactured of silicon dioxide having a thickness in a range of approximately 100 nm to 3 mm. In other embodiments, layer 18 may be manufactured of plastic, polycarbonate, a high transmissive dielectric, and a liquid material.

Spacing layer 18 having a thickness 30 may be formed in optical media 10 so as to adjust the position of label recording layer 20 with respect to data recording layer 14. In some embodiments, layer 18 may have a thickness in a range of 50 nm to 3 mm. In particular, the objective lens (not shown) utilized to project light 24, such as from a laser in an optical media drive, and the wavelength(s) of light 24 selected, may determine the focal point of the projected light, which in turn may correlate to a desired thickness of spacing layer 18. Accordingly, use of spacing layer 18 may allow data recording light 24a and label recording light 24b to be received by layers 14 and 20, respectively, within an acceptable focus range for each wavelength of light on each corresponding layer. In other words, the thickness of spacing layer 18 may be chosen or adjusted to allow label recording layer 20 to be spaced apart in stack 22 from data recording layer 14 a chosen distance 32 so as to position layer 20 in a focus range to receive optimum labeling power, and also to reduce undesired interference on label recording layer 20 from light beam 24a, or on data recording layer 14 from light beam 24b. Spacing layer 18 may also enhance desired thermal characteristics.

Spacing layer 18 may also provide advantageous physical and/or optical protection for data recording layer 14 such as from environmental contamination, such as water or oxidation, for example, that may penetrate through label recording layer 20. Spacing layer 18 may further define an optical coupling layer between selectively transmissive layer 16 and label recording layer 20. Accordingly, the material utilized for layer 18 may be chosen to have a particular complex refractive index. For example, in one embodiment layer 18 is formed of zero absorption materials (which means the extinction coefficient of complex index is zero) which has a refractive index that closely matches the refractive index of label recording layer 20 so as to reduce or eliminate the reflective loss on the interface of layers 16 to 18 and the interface of layers 18 to 20. In general, the greater the index difference of two materials at an interface, the higher the reflective loss.

By projecting both first and second wavelengths of light 24a and 24b to optical media 10 from the same side 26 of media 10, a groove tracking method may be utilized to track recording of data on layer 14 and to track recording of a visible label on label recording layer 18, without requiring a separate tracking system for each operation. In one embodiment, the groove tracking method may include utilizing a pre-stamp molded, sub-micron spiral track, having a groove width of approximately 0.3 to 5 microns, formed on surface 26 of optical media 10. The pre-stamped spiral groove may be used as a coordinate system for the data recording system. In particular, because a visible label may be recorded to layer 20 from the same side 26 of media 10 as the data is recorded to layer 14, a separate tracking system, such as a degree of movement measurement device and a radius measurement device (not shown) which may be utilized in designs wherein a visible label is formed on optical media 10 from an opposite side 34 of media 10, may not be needed for tracking the position of optical media 10 while a label is recorded on layer 14. Accordingly, the spiral groove formed in surface 26 of optical media 10 may be utilized for both data read/write and label recording operations, thereby potentially simplifying the tracking features and methods of the optical media drive or mechanism.

For purposes of the present description, the layers of stack 22 may be described as being formed or positioned on a preceding layer, such as describing layer 14 being formed on layer 12. However, other layers, not described herein, may be positioned between the layers described in detail herein. Moreover, in other embodiments, layer 20 may be initially formed such that the stack is built up in an order different from the build up method described herein.

FIG. 3 shows one embodiment of a method of manufacturing one embodiment of an optical medium. In particular, the method may include a step 38 of providing a substrate, a step 40 of disposing a data recording layer on the substrate, a step 42 of disposing a selectively transmissive layer on the data recording layer, and a step 46 of disposing a label recording layer on the selectively transmissive layer. The label recording layer may be optically accessible at only certain wavelengths through the data recording layer and through the selectively transmissive layer. The method may further include a step 44 of disposing a focusing layer between the selectively transmissive layer and the label recording layer. In one embodiment, the selectively transmissive layer may include multiple sublayers, which may each be disposed separately from one another. In other embodiments the above listed steps may be completed in a different order and other steps may be added or substituted in the above listed method.

The designs described here are shown for demonstration purposes, because the shape and bandwidth of the selectively transmissive layer can be shifted or changed easily to work with any possible data recording wavelength and disc labeling wavelength. Moreover, the spacing layer may not be included, depending on the first wavelength, the second wavelength, the labeling materials, and the optical lens utilized.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

We claim:

1. A medium, comprising:
   a substrate;
   a data recording layer positioned on said substrate;
   a selectively transmissive layer positioned on said data recording layer;
   a human readable label recording layer positioned on said selectively transmissive layer, said label recording layer optically accessible at only certain wavelengths through said data recording layer and through said selectively transmissive layer; and
   a focusing layer positioned between said selectively transmissive layer and said label recording layer.

2. The medium of claim 1 wherein said data recording layer is manufactured of phase change media.

3. The medium of claim 1 wherein said selectively transmissive layer comprises multiple sublayers.

4. The medium of claim 1 wherein said selectively transmissive layer is manufactured of one of a dielectric, a semi-metal, and a metal.

5. The medium of claim 4 wherein said selectively transmissive layer is chosen from one of a three sublayer GaAs/CaF2/GaAs layer, a three sublayer InP/SiO2/InP layer, and a six sublayer GaAs/CaF2/GaAs/CaF2/GaAs/CaF2 layer.

6. The medium of claim 1 wherein said selectively transmissive layer defines a thickness of greater than 15 nm and less than 5000 nm.

7. The medium of claim 1 wherein said label recording layer is manufactured of thermally activated label material.

8. The medium of claim 1 wherein said focusing layer is manufactured of one of silicon dioxide, polycarbonate, a high transmissive dielectric, and a liquid material.

9. The medium of claim 1 wherein said focusing layer defines a thickness chosen to focus a labeling light on said label recording layer.

10. The medium of claim 1 wherein said selectively transmissive layer defines a reflectance of at least seventy percent of a first wavelength of light and a transmittance of at least seventy percent of a second wavelength of light, said second wavelength of light being different from said first wavelength of light.

11. The medium of claim 10 wherein said first wavelength of light is less than 850 nm and wherein said second wavelength of light is at least 850 nm.

12. The medium of claim 10 wherein said first wavelength of light is in a range of 380 nm to 849 nm and said second wavelength of light is in a range of 780 to 1500 nm.

13. The medium of claim 1 further comprising a spacing layer positioned between said selectively transmissive layer and said label recording layer, wherein said spacing layer defines a thickness in a range of 50 nm to 3 mm.

14. A medium, comprising:
a substrate;
means for recording digital data thereon, said means for recording digital data thereon positioned on said substrate;
means for selectively reflecting light, said means for selectively reflecting light positioned on said means for recording data thereon;
means for recording human readable visible label information thereon, said means for recording visible label information thereon positioned on said means for selectively reflecting light,
wherein said means for selectively reflecting light reflects at least seventy percent of a first wavelength of light and transmits at least seventy percent of a second wavelength of light different from said first wavelength of light; and
means for spacing said means for selectively reflecting light from said means for recording label information thereon.

15. The medium of claim 14 wherein said first wavelength of light defines a data recording light and said second wavelength of light defines a label recording light.

16. The medium of claim 14 wherein said means for spacing defines a thickness adapted to focus a beam of label recording light on said means for recording label information thereon.

17. A method of recording a medium label, comprising:
projecting a label recording light beam through a data recording layer of an optical medium and through a selectively transmissive layer of said optical medium, and impinging it onto said human readable label recording layer of said optical medium; and
projecting said label recording light beam through a focusing layer of said medium and to said label recording layer of said medium, wherein said focusing layer positions said label recording layer on said medium such that said label recording light beam is focused on said label recording layer.

18. The method of claim 17 further comprising projecting a data recording light beam onto said data recording layer, wherein at least seventy percent of said data recording light beam is reflected by said selectively transmissive layer of said medium.

19. The method of claim 17 wherein at least seventy percent of said label recording light beam is transmitted by said selectively transmissive layer of said medium.

20. The method of claim 18 wherein said label recording light beam and said data recording light beam are both projected to said medium simultaneously.

21. A method of recording visible labeling to a medium, comprising:
projecting a first light to a first side of said medium, said first light recording data to said medium;
projecting a second light to said first side of said medium, said second light recording a visible label on said medium, wherein said first light is different from said second light, and wherein said visible label is visible to the naked human eye; and
focusing said second light through a focusing layer positioned on said medium.

22. The method of claim 21 wherein said first light is substantially reflected by a selectively transmissive layer and wherein said second light is substantially transmitted by said selectively transmissive layer.

23. The method of claim 21 wherein said first light records digital data on said medium.

24. A medium, comprising:
a substrate;
a data recording layer positioned on said substrate;
a spacing layer positioned on said data recording layer;
a label recording layer positioned on said spacing layer, said spacing layer positioning said label recording layer a distance from said data recording layer such that a label recording light projected through said data recording layer is focused on said label recording layer; and
a selectively transmissive layer positioned between said data recording layer and said spacing layer.

25. The medium of claim 24 wherein said label recording layer is optically accessible at only certain wavelengths through said substrate, said data recording layer, and said spacing layer.

26. A method of making a medium, comprising:
providing a substrate;
disposing a data recording layer on said substrate;
disposing a selectively transmissive layer on said data recording layer;
disposing a human readable label recording layer on said selectively transmissive layer, said label recording layer optically accessible at only certain wavelengths through said data recording layer and through said selectively transmissive layer; and
disposing a focusing layer between said selectively transmissive layer and said label recording layer.

27. The method of claim 26 wherein said disposing a selectively transmissive layer comprises disposing multiple sublayers.

* * * * *